US008239402B1

(12) United States Patent
Kumaresan et al.

(10) Patent No.: US 8,239,402 B1
(45) Date of Patent: Aug. 7, 2012

(54) STANDARD FILE SYSTEM ACCESS TO DATA THAT IS INITIALLY STORED AND ACCESSED VIA A PROPRIETARY INTERFACE

(75) Inventors: Balemurughan Kumaresan, Palo Alto, CA (US); Raghupathi Malige, San Jose, CA (US); Charles H. Silvers, Santa Clara, CA (US); Joseph M. Maionchi, Vallejo, CA (US); Pramodh Pisupati, Sunnyvale, CA (US); Sunil Kumar Tekkatte Subramanya, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 309 days.

(21) Appl. No.: 12/415,697

(22) Filed: Mar. 31, 2009

(51) Int. Cl.
*G06F 17/30* (2006.01)

(52) U.S. Cl. ...................................... 707/769

(58) Field of Classification Search .................. 717/609, 717/705–707, 737, 754, 769, 770, 802–803, 717/825
See application file for complete search history.

(56) References Cited

U.S. PATENT DOCUMENTS

| 7,275,063 B2 * | 9/2007 | Horn | 1/1 |
| 7,467,282 B2 * | 12/2008 | Rao et al. | 711/202 |
| 7,469,248 B2 * | 12/2008 | Agrawal et al. | 1/1 |

OTHER PUBLICATIONS

Cachè 3.2 Release Notes, "Chapter 1: New System and Language Features", www.intersystems.com/cache/technology/product-tables/release, printed Mar. 9, 2009, pp. 1-13.
Database Endian Conversion, "Big Endian and Little Endian Systems," http://www.nlm.cz/cachedoc/v413/cvd/cvdTOC.html, printed Mar. 9, 2009, pp. 1-3.

\* cited by examiner

*Primary Examiner* — John E Breene
*Assistant Examiner* — Tina Huynh
(74) *Attorney, Agent, or Firm* — Campbell Stephenson LLP

(57) ABSTRACT

Various methods and systems can be used to provide standard file system access to data that is originally accessed only by a proprietary interface. One such method involves querying an application (e.g., a database management system) for information identifying a location of each of several data objects within several volumes. The application provides a proprietary interface to the data objects stored on the volumes. The method then creates metadata, which associates each of several files within a new file system with the location of a respective one of the data objects within the volumes. The metadata can be created by an in-place conversion module implemented on a computing device. The method then provides the application with access to the files within the new file system, subsequent to creating the metadata.

20 Claims, 4 Drawing Sheets

STANDARD FILE SYSTEM ACCESS TO DATA THAT IS INITIALLY STORED AND ACCESSED VIA A PROPRIETARY INTERFACE

FIELD OF THE INVENTION

This invention relates to storage systems and, more particular, to providing non-proprietary access to data that is initially available via a proprietary interface.

DESCRIPTION OF THE RELATED ART

Certain applications provide a proprietary interface to the data that is generated and/or consumed by those applications. For example, many database management applications include proprietary interfaces that provide access to the databases managed by those database management applications. Customized, special purpose application can provide similar proprietary interfaces. These proprietary interfaces can provide access to data independently of any file system. Accordingly, the proprietary interfaces act as proprietary file system substitutes. Often, the data is not accessible via any other standard interface.

For many users, it is desirable to be able to access their data without needing to go through a proprietary interface. For example, a user may use backup software provided by one vendor to backup a database maintained by a database management application provided by another vendor. The backup software does not include the proprietary interface usable to access the database. Accordingly, enabling the backup software to access the database via the proprietary interface provided by the database management application may be difficult or even impossible. In general, the use of proprietary interfaces can limit the easy sharing and flexibility in moving data between different applications, if not all applications include the proprietary interface.

SUMMARY OF THE INVENTION

Various embodiments of methods and systems are disclosed for providing standard file system access to data that is originally accessed only by a proprietary interface. In one embodiment, such a method involves querying an application (e.g., a database management system) for information identifying a location of each of several data objects within several volumes. The application provides a proprietary interface to the data objects stored on the volumes.

The method then creates metadata, which associates each of several files within a new file system with the location of a respective one of the data objects within the volumes. The metadata can be created by an in-place conversion module implemented on a computing device. The method then provides the application with access to the files within the new file system, subsequent to creating the metadata.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
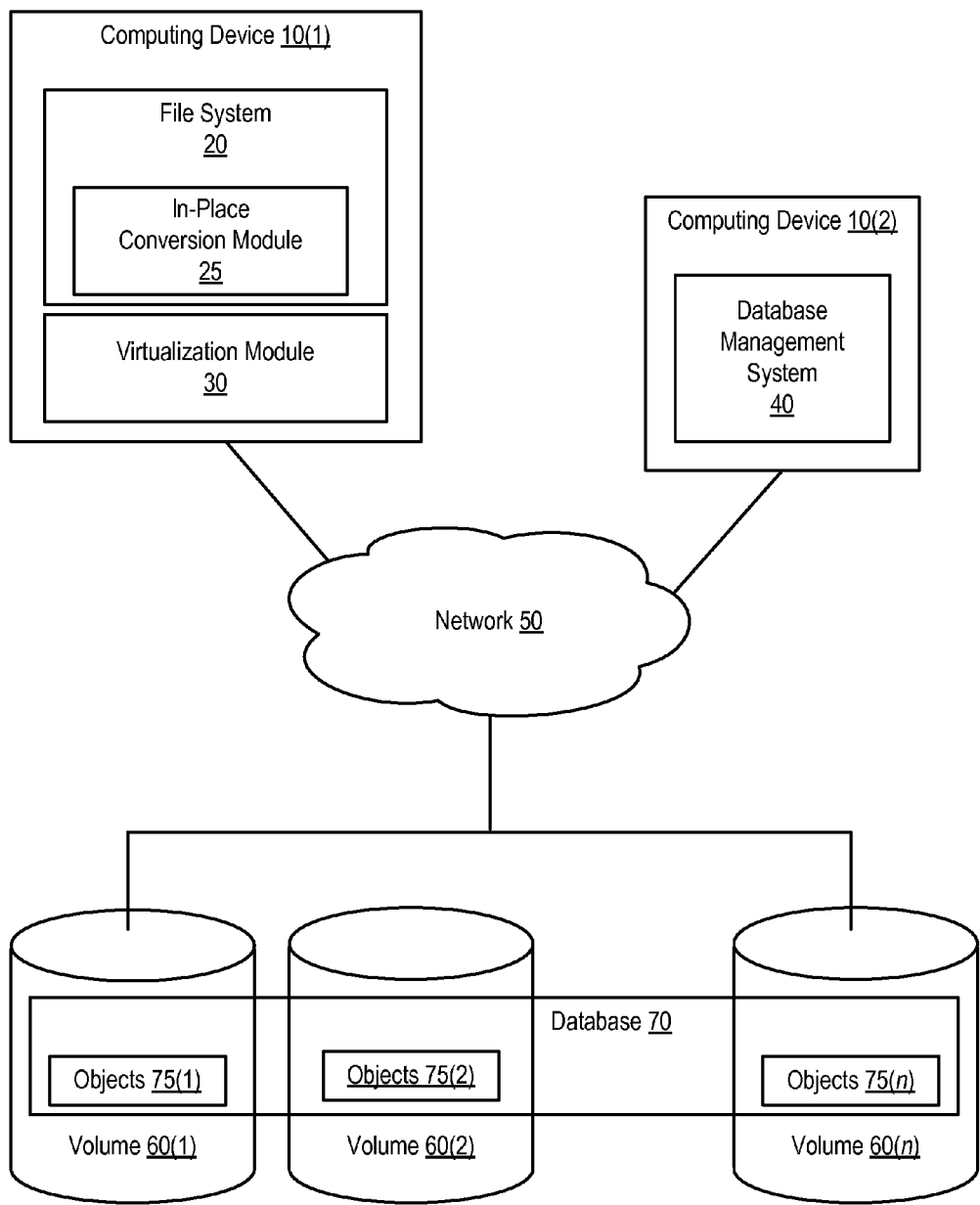
FIG. 1 is a block diagram of a system that can provide access to data, which is initially accessible only via a proprietary interface, via a standard file system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that can provide access to data, which is initially accessible only via a proprietary interface, via a standard file system. As shown, the system includes two computing devices 10(1) and 10(2). Computing device 10(1) implements a file system 20, which includes an in-place conversion module 25. File system 20 provides a standard interface to data, which is maintained in a file system data structure (e.g., a hierarchical arrangement of directories and files). Other applications can access the data maintained by file system 20 via this standard interface. In one embodiment, file system 20 is VERITAS™ File System (e.g., as provided in one of the VERITAS™ Storage Foundation family of products), available from Symantec, Corp. of Cupertino, Calif.

Computing device 10(1) also implements a virtualization module 30. Virtualization module 30 is configured to implement and facilitate access to virtualized storage devices called volumes. Each volume is a logical storage device that can be implemented on one or more underlying physical storage devices, which can in turn implement storage policies such as striping or mirroring. Virtualization module 30 allows the underlying implementation details to be hidden from applications that access data stored on the volumes maintained by virtualization module 30. In one embodiment, virtualization module 30 is VERITAS™ Volume Manager (e.g., as provided in one of the VERITAS™ Storage Foundation family of products), available from Symantec, Corp. of Cupertino, Calif.

Computing device 10(2) implements a database management system 40. Database management system 40 is an example of an application that provides a proprietary interface to data. When such a proprietary interface is provided, other applications that do not include or otherwise support the proprietary interface cannot access the data without interacting with database management system 40. In many situations, this can reduce the ability of the other applications to efficiently share data with database management system 40 or to move copies of the data maintained by database management system 40. For example, a backup application may be unable to efficiently perform backups of data maintained by database management system 40 via the proprietary interface.

Other applications (instead of database management system 40) can also provide proprietary interfaces to the data maintained by those applications. For example, a customer may hire a software developer to provide a custom software application to serve a specific purpose for that customer. Such a custom application may incorporate a proprietary interface.

In this example, computing devices 10(1) and 10(2) are coupled by network 50. Network 50 can include one or more storage, local, and/or wide area networks. Network 50 can be implemented using various topologies, communication protocols, and physical links (e.g., wireless links, coaxial cables, and the like). In some embodiments, certain components may be directly connected, as opposed to being connected via a network.

Network 50 also couples computing devices 10(1) and 10(2) to a physical storage system that implements volumes 60(1)-60(n). These volumes store a database 70 that is managed by database management system 40. As shown, database 70 includes several data objects 75(1)-75(n), which are distributed across volumes 60(1)-60(n). In particular, one or more data objects 75(1) are stored in volume 60(1), one or more data objects 75(2) are stored in volume 60(2), and one or more data objects 75(n) are stored in volume 60(n). Some data objects may be stored across multiple volumes (e.g., less than all of such a data object is stored on any one volume). Some data objects may be replicated across (e.g., redundant copies of such data objects can be stored on each of) multiple volumes.

Data objects 75(1)-75(n) are objects that database management application 40 manages as single items. For example, data objects 75(1)-75(n) can include files, tables, tablespaces, and the like.

As noted above, file system 20 is an application that is configured to organize data in a file system data structure (such a data structure is also referred to as a file system). The file system includes multiple files. Special files, called directories, can group one or more files together. Directories and files can be arranged in a hierarchical manner. File system 20 maintains metadata (not shown) that maps each file to the location(s) in one or more underlying volumes that store the data contained within that file.

In-place conversion module 25 is configured to generate new metadata that will allow file system 20 to provide access to database 70. Accordingly, the new metadata treats the data objects 75(1)-75(n) within database 70 as files within a file system. In-place conversion module 25 performs an "in-place" conversion in the sense that the underlying data objects 75(1)-75(n) are not modified or copied during the conversion process that provides access to those data objects via the file system. Instead of modifying or copying the underlying data, the in-place conversion process simply generates new logical structures and information, such as new file system metadata, that organizes the existing data objects within a new file system. In other words, in-place conversion module 25 creates metadata for a new file system, and this metadata references the same copy of application data that is used by the application that provides the proprietary interface to the data. Details regarding the in-place conversion process are discussed below with respect to FIG. 3.

In some embodiments, in-place conversion module 25 generates the new file system metadata in a non-destructive fashion that preserves the metadata used by database management system 40 to implement its proprietary interface. This allows an unsuccessful conversion to be undone, such that database 70 is still accessible via database management system 40. If the conversion process instead modified the metadata used by database management system 40, the conversion process could not be undone (at least not without having to do a time consuming restoration of the database from a backup copy, which may lose any information that was entered into the database after that backup copy was created).

As shown in this example, database 70 spans multiple volumes. Performing an in-place conversion of a set of data that spans multiple volumes is more complex than performing an in-place conversion of data on a single volume, since the conversion needs to account for both locations of data objects within the volumes and the identities of each of the volumes.

In general, the application that provides the proprietary interface can maintain its data on multiple storage devices. Such storage devices can include logical storage devices, such as volumes and logical unit numbers (LUNs), or physical storage devices, such as hard disks, hard disk arrays, disk partitions, and the like. When the in-place conversion module 25 begins the in-place conversion process, in-place conversion module 25 can first convert the underlying storage devices used by the application into volumes, and then begin processing the volumes. Accordingly, while the examples herein frequently describe processes that are performed on volumes, it is noted that such volumes may themselves have been created during the in-place conversion process from underlying storage devices used by the application.

FIG. 1 shows an example of a situation in which in-place conversion module 25 is included as part of file system 20. Alternatively, in-place conversion module 25 can be a separate application that is implemented independently of file system 20. In yet other embodiments, in-place conversion module 25 can be implemented as part of a suite of interrelated applications, such as VERITAS Storage Foundation, that includes, for example, a file system and a virtualization module.

Figure 2:
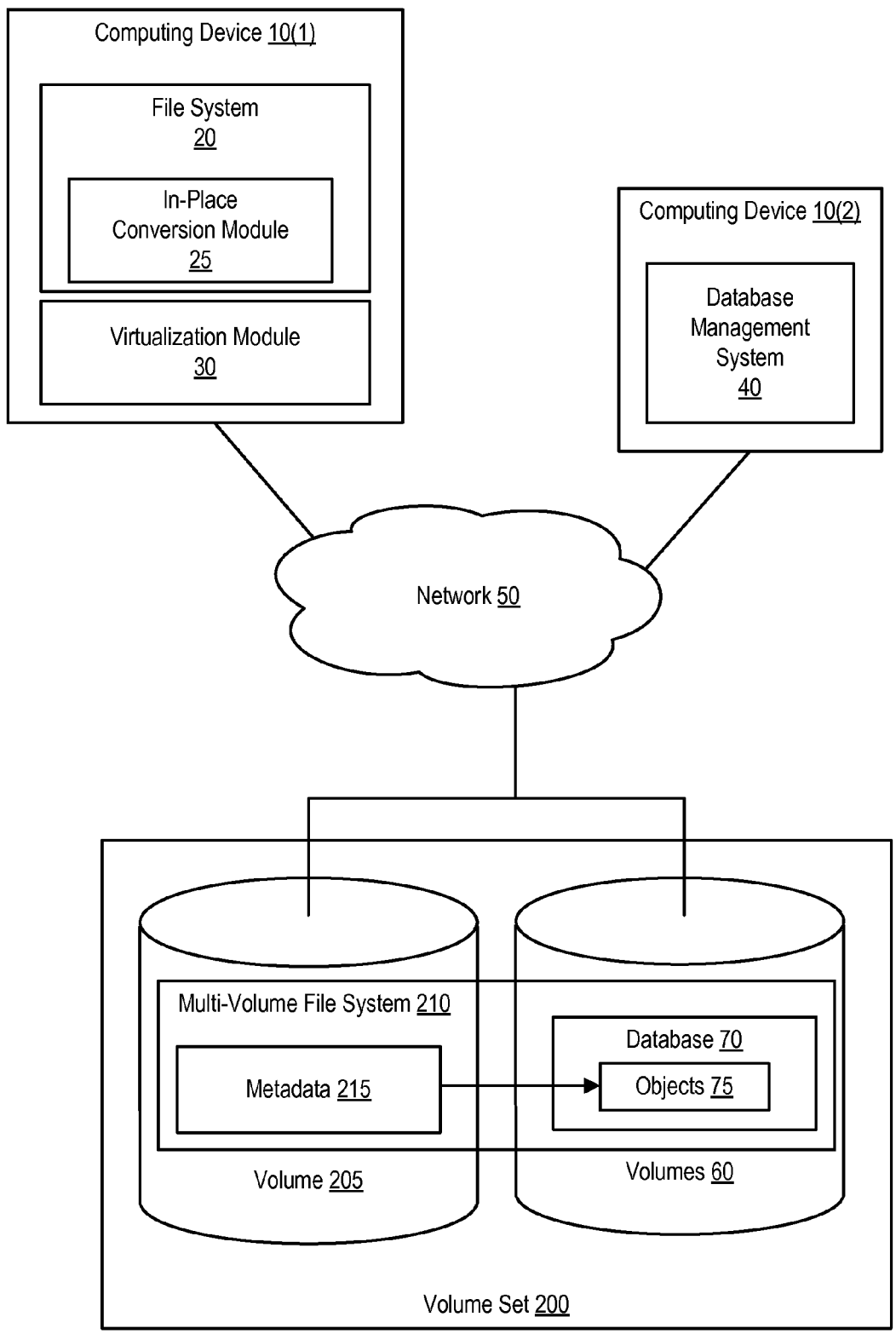
FIG. 2 is another block diagram of the system of FIG. 1, illustrating how the data can be accessed via a standard file system, according to one embodiment of the present invention.

FIG. 2 is another block diagram of the system of FIG. 1, illustrating how the data can be accessed via a standard file system. FIG. 2 illustrates the organization of the data, after in-place conversion module 25 has performed an in-place conversion. Here, volumes 60(1)-60(n) are collectively referred to as volumes 60, and data objects 75(1)-75(n) are collectively referred to as data objects 75.

As shown, in-place conversion module 25 has created (e.g., by interacting with virtualization module 30) a new volume set 200. New volume set 200 includes volumes 60 and a new volume 205. In-place conversion module 25 has created a new multi-volume file system 210 (e.g., by interacting with file system 20) that organizes data stored in volume set 200. Multi-volume file system 210 is a file system data structure that organizes data spanning multiple volumes. The new volume 205 within volume set 200 stores metadata 215 for multi-volume file system 210.

Multi-volume file system 210 includes a file that includes each data object included in database 70. Metadata 215 identifies each file within multi-volume file system 210, as well as the size and location (within volume set 200) of the data within each file. When an application (such as database management system 40) requests access to a particular file, file system 20 uses metadata 215 to locate that file within volume set 200 and then returns the requested file to the requesting application.

After generating creating volume set 200, adding volumes 60 to volume set 200, creating a new metadata volume 205 within volume set 200, creating a multi-volume file system 210 on volume set 200, and creating metadata 215 within volume 205, in-place conversion module 25 verifies that the in-place conversion was performed successfully. Verification can involve running a file system check (e.g., by invoking a "fsck," "scandisk," or "chkdsk" utility provided by file system 20) to verify the consistency of multi-volume file system 210. Verification can also involve running an application-specific utility to verify that multi-volume file system 210 is consistent with respect to the application. For example, a database consistency check utility (e.g., as invoked using a command like "dbverify") provided by database management system 40 can be invoked to check that multi-volume file system 210 provides access to database 70 in a manner that can be consistently accessed by database management system 40. The latter check can also verify that none of data objects 75 were modified during the in-place conversion.

If verification is successful, in-place conversion module 25 can redirect database management system 40, causing database management system 40 to begin accessing database 70 via file system 20 instead of via the proprietary interface provided by database management system 40. This redirection can be performed by restarting database management system 70 and using standard query language (SQL) commands to change the path to database 70 to that provided by multi-volume file system 210. Database management system 40 can then open database 70 via file system 20, using the path provided.

It is noted that in-place conversion module 25 has not modified the metadata used by database management system 40 or data objects 75. Accordingly, if an error is detected during the verification process, database management application 40 can continue to access database 70 via its proprietary interface, without any data loss or change in operation.

Because in-place conversion module 25 performs an in-place conversion, none of data objects 75 need to be moved or copied during the conversion process. This provides several advantages over other conversion techniques. In particular, because data objects 75 do not need to be copied or moved (a time consuming process, especially if database 70 is very large), the in-place conversion can be performed more quickly than conversions that involve copying or moving the application data. Similarly, the amount of storage space needed to perform an in-place conversion is significantly less than that needed to perform a conversion using a technique that involves copying the application data. As shown, the in-place conversion only needs enough additional storage space to configure the new volume set and new multi-volume file system and to store the new metadata. In contrast, a conversion technique that involves copying the application data will need at least twice as much storage as is present in the original system in order to store the duplicated application data.

Figure 3:
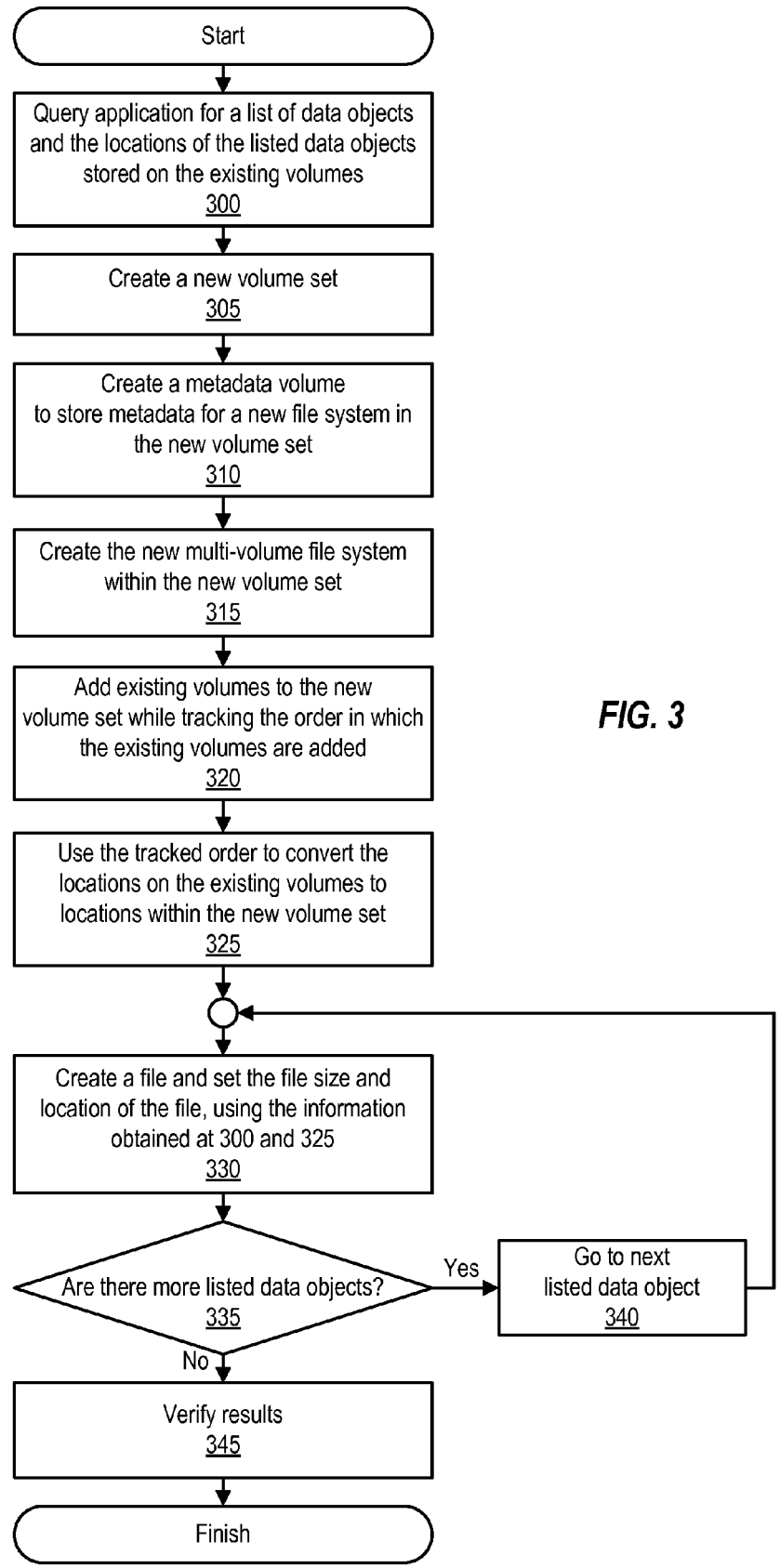
FIG. 3 is a flowchart of a method of providing access to data, initially accessible only via a proprietary interface, via a standard file system, according to one embodiment of the present invention.

FIG. 3 is a flowchart of a method of providing access to data, initially accessible only via a proprietary interface, via a standard file system. This method can be performed by an in-place conversion module 25 like that shown in FIGS. 1, 2, and 4.

The method can begin when a user requests an in-place conversion (not shown). Such a request can be received via an interface such as a command line interface (CLI), application programming interface (API), or graphical user interface (GUI). The request can specify the identity of the application data to be converted from data that is accessed via a proprietary interface to data that is accessed via a standard file system interface. For example, if the application data to be converted is a database, the request can identify the network address and/or identity of the database management system and/or the identity of a particular database managed by that database management system.

In some embodiments, the request can also specify particular items of data within the application data to be converted and/or to be excluded from the conversion. For example, the request can specify that duplicate or replicated data objects (i.e., data objects that are exact copies of other data objects) should not be included in the conversion process. Similarly, the request can specify that temporary data objects (e.g., data objects that are being used to store intermediate processing results for the application) should not be included in the conversion process. As yet another example, the request can select certain data objects (e.g., certain tablespaces within a database) to be converted, indicating that non-selected data objects should not be converted.

In response to receipt of such a request, the application is queried for the identities of all of its data objects (or of the specified data objects, if fewer than all are specified in the request), as well as for metadata identifying the volumes on which the identified data objects reside and identifying the location(s) of each data object within those volumes, as shown at 300. The application returns the requested information, which can be at least temporarily stored (e.g., as information 450 of FIG. 4).

A new volume set is created (e.g., by requesting a new volume set from a virtualization module), as shown at 305. A new volume, which is configured to store file system metadata, is added to the new volume set, as shown at 310.

The new volume is configured to be large enough to store all of the metadata for the application data specified in the request. The size of the new volume can be a default size. For example, if the application data is a database, the new volume can be set to a default size that is large enough to store metadata for the average database (e.g., one Gigabyte). Alternatively, instead of selecting a default size, a size that is based upon the size of the application data to be converted can be selected. For example, if the application data is a database and the size of the database is received as part of the request or in response to the performance of the queries in operation 300, the new volume can be configured having a size equal to one percent of the size of the application data.

In some embodiments, volumes can be configured as different types of volumes. For example, data-only volumes are a type of volume that only stores application data. No file system metadata can be stored on a data-only volume. Metadata volumes can store both application data and file system metadata. Accordingly, in such embodiments, the new volume can be a metadata volume.

At 315, a new multi-volume file system is created in the volume set that was created at 305. The data objects within the application data to be converted will be added as files within the new multi-volume file system.

At 320, the volumes storing the application data are added to the new volume set created at 305. The order in which the volumes are added to the new volume set is tracked. Information identifying the tracked order can be, at least temporarily, stored. For example, if the application uses several logical storage devices identified by logical unit numbers (LUNs), these LUNs may be converted to volumes that have new identities. The new volumes corresponding to the LNs are then added to the new volume set. During the conversion process, the order in which the volumes are added to the new volume set can be tracked by creating information associating each preexisting LUN (e.g., LUN A) with the new identity (e.g., Volume 2) of the volume to which the LUN was converted.

In some embodiments, the virtualization module being used to create the new volume set may require all volumes to store certain metadata. In such embodiments, before each existing application data volume is added to the new volume set, free space (e.g., space that is not storing metadata used by the application or the application data) on each existing application data volume is used to store the required metadata. If no free space is available, an error indication can be generated (otherwise, attempting to proceed would require that application metadata and/or application data be destroyed, which would reduce the likelihood that the conversion process could be undone if other errors arise).

At 325, the tracked order in which the volumes were added to the new volume set is used to convert the location information obtained by querying the application (at 300) into information that identifies the location of each data object within the new volume set. For example, if the location information obtained from the application indicated that a particular data object was stored at a first offset within volume A, and if volume A was the second volume in the new volume set (e.g., the second volume after the new volume created at 310), the converted location information could indicate that the particular data object is located at the first offset within the second volume of the volume set.

Once the location information has been converted (at 325) and the new multi-volume file set has been created, the conversion process can begin creating files within the new multi-volume file set. Operation 330 creates a file and generates the metadata for that file. Often, file creation and metadata generation are performed independently, and thus performance of operation 330 may involve performing several independent sub-operations.

Operation 330 is repeated for each data object that is part of the data to be converted and that was identified by the application in response to the query submitted at 300. Thus, after creating a file for one data object and generating the file's metadata, if there are more listed data objects (335), the conversion moves to the next listed data object (340) and repeats operation 330 for that next data object. In alternative embodiments, the data objects can be processed in an order that is different than the order in which the data objects are listed by the application in response to the query submitted at 300.

Each file created by performing operation 330 of the conversion process corresponds to one of the data objects within the application data to be converted. In one embodiment, files are created by specifying each file as the target of a file system command such as "touch." If such a command is performed on a nonexistent file, the command will create the file, such that the file has a size of zero and is not mapped to any data blocks.

The files created by operation 330 can be organized in the same manner (e.g., a flat file set, a hierarchical structure, or the like) as the data objects maintained by the application. For example, if the query performed at 300 returned the identities of the data objects as a set of pathnames, the same pathnames can be used for the files created by the conversion process. Thus, if a pathname specifies that a data object is located within a directory, a directory file corresponding to the directory can be created within the new file system. A new file corresponding to the data object can then be created within the new directory in the new file system.

Operation 330 also creates the metadata for a new file. In particular, performance of operation 330 sets the size and location of each new file. The size of each file is set to equal the size of the corresponding data object (e.g., as returned in response to the query submitted at 300, or as determined by accessing the data object). The location of each new file is set to identify the location of the corresponding data object within the new volume set created at 305. Accordingly, the location of the data object is the location determined at 325. Performing operation 330 effectively maps the new file to the preexisting data object without copying any application data.

A given data object may be fragmented within volumes 60. For example, a tablespace may include more than one extent (a variable-length group of data, identified by a beginning address or offset and length, or by both beginning and ending addresses or offsets). The location information for the new file can identify the location of each extent, as well as the order in which the data in those extents should be combined to produce the corresponding data object.

The file size and location metadata can be generated in a variety of different ways. In one embodiment, the file system application used to create and maintain the new multi-volume file system provides a private file system input/output control (ioctl) kernel-level command to set the file size and another private ioctl command to set the location(s) of file data. In such an embodiment, the conversion process can access these private ioctl commands to set the file size and location(s). These commands can be invoked while the application that provides the proprietary interface to the data being converted is still online, provided that the application is in a state in which the application does not grow or shrink any data objects. If such a state is not available, it may be desirable to temporarily take the application offline while these commands are invoked.

Alternatively, the conversion process can disable the application (e.g., by shutting down operation of the database management system, at least with respect to the database being converted). After the application has been disabled, the conversion process can call a file system utility (invoked in a manner that does not use the kernel driver, unlike the ioctls described above) to set the size and location of each new file.

Once files have been created, and the corresponding metadata generated, for all of the data objects identified in response to the query submitted at 300, the conversion process can verify the results of the conversion process, as shown at 345. Verification can be performed to verify the consistency of the new multi-volume file system. Additional verification can verify the continued consistency of the underlying application data.

If verification fails, an error can be signaled (e.g., by logging an error, displaying an error indication to an administrator, and the like). In this situation, the application continues to access its application data via the proprietary interface.

If verification is successful, the application is restarted and instructed to begin accessing the converted application data via the new file system interface (e.g., as described above). Once the application has been redirected to the new file system interface, the application may be unable to access the data via the proprietary interface. For example, once the application begins modifying or moving data via the file system interface, the metadata used by the proprietary interface may be overwritten or become invalid (e.g., the proprietary interface's metadata may no longer correctly identify the identity, size, and/or location of data objects). Accordingly, attempting to subsequently access the converted data via the proprietary interface may result in errors.

It is noted that in alternative embodiments, additional operations can be performed instead of and/or in addition to those shown in FIG. 3. Similarly, in alternative embodiments, some operations may be omitted.

Many of the operations shown in FIG. 3 can be performed in a different order than is illustrated. For example, all or some of operations 305, 310, and 315 can be performed prior to performance of operation 300. Similarly, some operations can be performed in parallel with each other. For example, several instances of operation 330 can be performed in parallel with each other, to simultaneously create files and metadata for several different data objects.

While the above discussion describes examples in which the in-place conversion adds existing volumes to a new volume set, other embodiments may perform an in-place conversion to a single volume. Here, instead of adding the volumes used by the application to a new volume set, the in-place conversion module can create a new volume to store the file system metadata, and then logically append the volumes storing the application data to the new volume. The in-place conversion module can track the size of each appended volume and the order in which the volumes are appended, and then use the tracked information to calculate the metadata. For example, if the first appended volume (i.e., the first existing volume to be appended to the new volume for storing the file system metadata) is 25 Gigabytes in size and a particular data object is located at a particular offset within the first appended volume, the in-place conversion module can add the particular offset within the first appended volume, the size of the first appended volume, and the size of the new volume to get the new offset to the data object within the combined volume. In embodiments that combine the new metadata volume and the existing application data volumes into a single new volume, a multi-volume file system is not necessary to access to the data objects.

Figure 4:
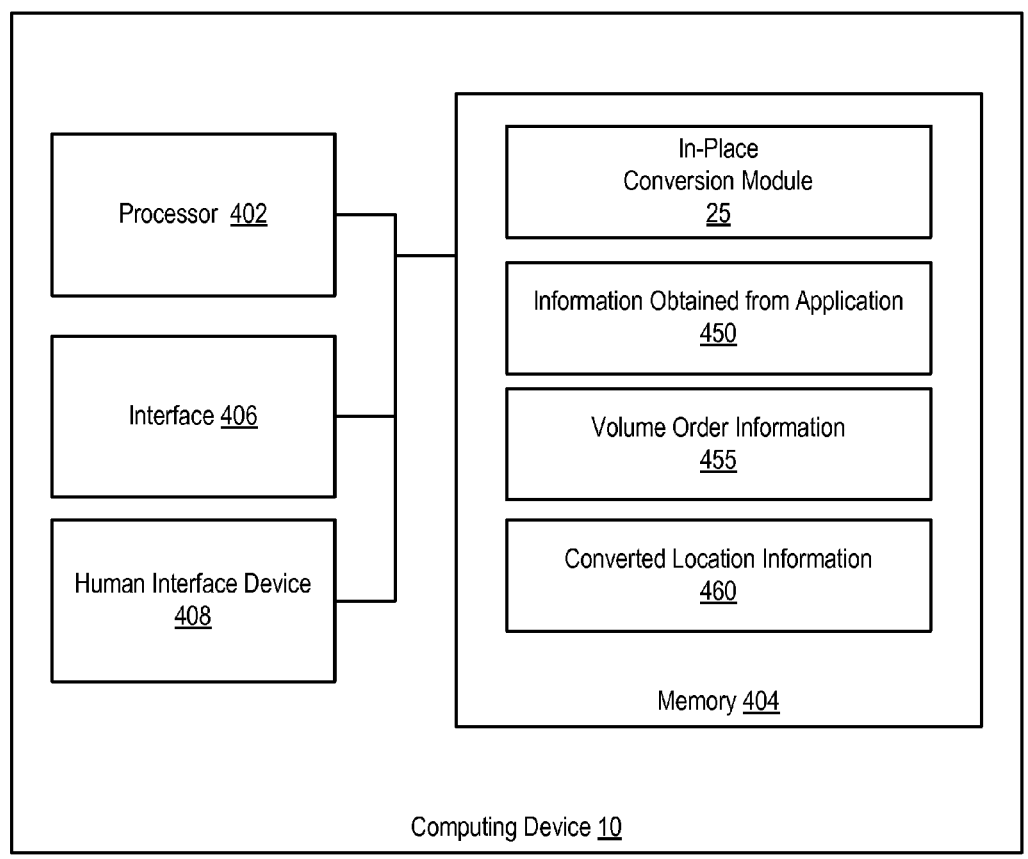
FIG. 4 is a block diagram of a computing device, illustrating how an in-place conversion module can be implemented in software in one embodiment of the present invention.

FIG. 4 is a block diagram of a computing device 10 (e.g., similar to computing device 10(1) of FIGS. 1 and 2), illustrating how in-place conversion module 25 (e.g., as shown in FIGS. 1 and 2) can be implemented in software. By executing the software that implements in-place conversion module 25, computing device 10 becomes a special purpose computing device that is configured to perform in-place conversions, which make data that was previously accessible only via a proprietary interface accessible via a standard file system interface. Performance of the in-place conversion transforms user data from one format, accessible only via proprietary interface, into another format that is accessible via a standard file system interface.

Computing device 10 can be a personal computer, network appliance, server, personal digital assistant, mobile phone, storage controller (e.g., an array controller, tape drive controller, or hard drive controller), laptop computer, or the like. In general, computing device 10 is configured to execute software or otherwise provide appropriate functionality to act as a component of the system described herein.

As illustrated, computing device 10 includes one or more processors 402 (e.g., microprocessors, programmable logic devices (PLDs), or application specific integrated circuits (ASICs)) configured to execute program instructions stored in memory 404. Memory 404 can include various types of RAM, Read Only Memory (ROM), Flash memory, micro electro-mechanical systems (MEMS) memory, magnetic core memory, and the like. Memory 404 can include both volatile and non-volatile memory. Computing device 10 also includes one or more interfaces 406. Processor 602, interface 406, and memory 404 are coupled to send and receive data and control signals by a bus or other interconnect.

Interface 406 can include a network interface to various networks (e.g., such as network 50 of FIG. 1 and/or interfaces to various peripheral buses. For example, interface 406 can include a network interface (e.g., implemented as a network interface card) via which commands generated by in-place conversion module 25 can be sent to other devices. For example, such a network interface can also allow in-place conversion module 25 to communicate with an application (e.g., in order to obtain information describing the identities of data objects maintained by that application, as well as information identifying the location of those data objects within a set of volumes), if the application is not implemented on computing device 10. Interface 406 can also include an interface to one or more storage devices (e.g., on which data affected by the in-place conversion is persistently stored).

Human user interface 408 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting an in-place conversion) to and output from (e.g., indicating an error that occurred during an in-place conversion) in-place conversion module can be received and/or sent via such an input and/or output device.

In this example, program instructions and data executable to implement all or part of in-place conversion module 25 are stored in memory 404. Additionally, memory 404 can store information that is generated by and/or processed by in-place conversion module 25. Such information can include information 450 identifying data objects and their locations within a set of volumes, which is obtained from the application that provides the proprietary interface to the data. Such information can also include volume order information 455, which indicates the order in which the set of volumes accessed by the application are added to a new volume set. Additionally, such information can include converted location information 460, which indicates the location of each data object within the new volume set.

The program instructions and data implementing in-place conversion module 25 can be stored on various computer readable storage media such as memory 404. In some embodiments, such software is stored on a computer readable storage medium such as a compact disc (CD), digital versatile disc (DVD), hard disk, optical disk, tape device, floppy disk, and the like). In order to be executed by processor 402, the instructions and data can be loaded into memory 404 from the other computer readable storage medium. The instructions and/or data can also be transferred to computing device 10 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   querying an application for information identifying a location of each of a plurality of data objects within a plurality of volumes, wherein the application provides a proprietary interface to the data objects stored on the volumes, and
   the proprietary interface inhibits independent access to the data objects by other applications;
   creating metadata, wherein the metadata associates each of a plurality of files within a new file system with the location of a respective one of the plurality of data objects within the volumes, and wherein the metadata is created by an in-place conversion module implemented on a computing device;
   providing the application with access to the files within the new file system, subsequent to creating the metadata, wherein the providing comprises supplying the application with a path to the files; and
   wherein the querying the application for information comprises sending a query from a first computing device to a second computing device via a network, wherein the first computing device performs said identifying and said creating, and wherein the second computing device implements the application.

2. The method of claim 1, wherein the application is a database management system.

3. The method of claim 1, further comprising:
creating a new volume set, wherein a first volume within the new volume set stores the metadata; and
creating the new file system within the new volume set, wherein the new file system is a multi-volume file system.

4. The method of claim 3, further comprising:
adding each of the volumes to the new volume set without moving the data objects to new locations, wherein the creating the metadata comprises:
using information identifying the location of one of the data objects to generate information identifying a volume set location, wherein the volume set location is identified with respect to the new volume set; and
specifying the volume set location as a location of a corresponding one of the files, wherein the corresponding one of the files corresponds to the one of the data objects.

5. The method of claim 1, wherein the creating the metadata comprises:
creating the files using a file system command, wherein when the files are created, each of the files is zero bytes in size and is not mapped to any data blocks, and wherein one file is created for each of the data objects.

6. The method of claim 1, wherein the creating the metadata comprises: setting a size of each of the files to equal a size of a corresponding one of the data objects; and setting mapping information for one or more extents of each of the files to specify the location of the corresponding one of the data objects.

7. The method of claim 1, further comprising disabling the application prior to creating the metadata.

8. The method of claim 1, wherein the creating the metadata is performed without modifying any metadata maintained by the application.

9. A non-transitory computer readable storage medium comprising program instructions executable by one or more processors to:
query an application for information identifying a location of each of a plurality of data objects within a plurality of volumes, wherein the application provides a proprietary interface to the data objects stored on the volumes, and the proprietary interface inhibits independent access to the data objects by other applications;
create metadata, wherein the metadata associates each of a plurality of files within a new file system with the location of a respective one of the plurality of data objects within the volumes, wherein a file system application uses the metadata to provide the application with access to the files within the new file system by supplying the application with a path to the files; and
wherein the querying the application for information comprises sending a query from a first computing device to a second computing device via a network, wherein the first computing device performs said identifying and said creating, and wherein the second computing device implements the application.

10. The non-transitory computer readable storage medium of claim 9, wherein the application is a database management system.

11. The non-transitory computer readable storage medium of claim 9, wherein the program instructions are further executable to:
create a new volume set, wherein a first volume within the new volume set stores the metadata; and create the new file system within the new volume set, wherein the new file system is a multi-volume file system.

12. The non-transitory computer readable storage medium of claim 11, wherein the program instructions are further executable to:
add each of the volumes to the new volume set without moving the data objects to new locations, wherein the creating the metadata comprises:
using information identifying the location of one of the data objects to generate information identifying a volume set location, wherein the volume set location is identified with respect to the new volume set; and
specifying the volume set location as a location of a corresponding one of the files, wherein the corresponding one of the files corresponds to the one of the data objects.

13. The non-transitory computer readable storage medium of claim 9, wherein creation of the metadata comprises:
creating the files using a file system command, wherein when the files are created, each of the files is zero bytes in size and is not mapped to any data blocks, and wherein one file is created for each of the data objects.

14. The non-transitory computer readable storage medium of claim 9, wherein creation of the metadata comprises:
setting a size of each of the files to equal a size of a corresponding one of the data objects; and
setting mapping information for one or more extents of each of the files to specify the location of the corresponding one of the data objects.

15. The non-transitory computer readable storage medium of claim 9, wherein the program instructions are further executable to disable the application prior to creating the metadata.

16. The non-transitory computer readable storage medium of claim 9, wherein the metadata is created without modifying any metadata maintained by the application.

17. A system comprising:
one or more processors; and
a memory coupled to the one or more processors, wherein the memory stores program instructions executable by the one or more processors to:
query an application for information identifying a location of each of a plurality of data objects within a plurality of volumes, wherein the application provides a proprietary interface to the data objects stored on the volumes, and the proprietary interface inhibits independent access to the data objects by other applications;
create metadata, wherein the metadata associates each of a plurality of files within a new file system with the location of a respective one of the plurality of data objects within the volumes, wherein a file system application uses the metadata to provide the application with access to the files within the new file system by supplying the application with a path to the files; and
wherein the querying the application for information comprises sending a query from a first computing device to a second computing device via a network, wherein the first computing device performs said identifying and said creating, and wherein the second computing device implements the application.

18. The system of claim 17, wherein the program instructions are further executable to:

create a new volume set, wherein a first volume within the new volume set stores the metadata; and create the new file system within the new volume set, wherein the new file system is a multi-volume file system.

19. The system of claim 18, wherein the program instructions are further executable to: add each of the volumes to the new volume set without moving the data objects to new locations, wherein the creating the metadata comprises:

using information identifying the location of one of the data objects to generate information identifying a volume set location, wherein the volume set location is identified with respect to the new volume set; and specifying the volume set location as a location of a corresponding one of the files, wherein the corresponding one of the files corresponds to the one of the data objects.

20. The system of claim 17, wherein creation of the metadata comprises:

setting a size of each of the files to equal a size of a corresponding one of the data objects; and setting mapping information for one or more extents of each of the files to specify the location of the corresponding one of the data objects.

* * * * *